(12) United States Patent
Rajakarunanayake et al.

(10) Patent No.: US 8,170,023 B2
(45) Date of Patent: May 1, 2012

(54) SYSTEM AND METHOD FOR A SOFTWARE-BASED TCP/IP OFFLOAD ENGINE FOR IMPLEMENTING EFFICIENT DIGITAL MEDIA STREAMING OVER INTERNET PROTOCOL NETWORKS

(75) Inventors: Yasantha Rajakarunanayake, San Ramon, CA (US); Lars Severin, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 956 days.

(21) Appl. No.: 11/708,439

(22) Filed: Feb. 20, 2007

(65) Prior Publication Data

US 2008/0198781 A1 Aug. 21, 2008

(51) Int. Cl.
*H04L 12/56* (2006.01)

(52) U.S. Cl. ..... 370/392; 370/401; 370/410; 370/395.7; 370/395.1

(58) Field of Classification Search .......... None
See application file for complete search history.

(56) References Cited

U.S. PATENT DOCUMENTS

| 5,872,777 | A * | 2/1999 | Brailean et al. ............ 370/349 |
|---|---|---|---|
| 5,915,094 | A | 6/1999 | Kouloheris et al. |
| 6,674,731 | B1 * | 1/2004 | Bradshaw et al. .......... 370/316 |
| 6,947,430 | B2 * | 9/2005 | Bilic et al. .............. 370/395.71 |
| 6,965,941 | B2 * | 11/2005 | Boucher et al. ............ 709/230 |
| 7,000,024 | B1 | 2/2006 | Champagne et al. |
| 7,009,967 | B1 | 3/2006 | Hariharasubrahmanian |
| 7,047,273 | B2 | 5/2006 | Kamentsky et al. |
| 7,315,898 | B2 | 1/2008 | Kohno |
| 7,324,516 | B2 * | 1/2008 | Daniel et al. .............. 370/392 |
| 7,430,617 | B2 * | 9/2008 | Walsh et al. .............. 709/247 |
| 7,773,546 | B2 | 8/2010 | Rajakarunanayake et al. |
| 7,908,624 | B2 | 3/2011 | Rajakarunanayake |
| 2002/0095519 | A1 * | 7/2002 | Philbrick et al. ............ 709/250 |
| 2003/0145101 | A1 * | 7/2003 | Mitchell et al. ............ 709/236 |
| 2004/0062245 | A1 * | 4/2004 | Sharp et al. ............... 370/392 |
| 2005/0055720 | A1 | 3/2005 | Atad et al. |
| 2006/0080707 | A1 * | 4/2006 | Laksono ..................... 725/38 |
| 2006/0174287 | A1 * | 8/2006 | Maeda ....................... 725/80 |
| 2006/0182025 | A1 | 8/2006 | Kim et al. |
| 2006/0282855 | A1 | 12/2006 | Margulis |
| 2007/0240191 | A1 | 10/2007 | Singh et al. |
| 2008/0117911 | A1 | 5/2008 | Rajakarunanayake et al. |

(Continued)

OTHER PUBLICATIONS

Non-Final Office Action received for U.S. Appl. No. 11/717,326, mailed on Aug. 3, 2009, 17 pages.

(Continued)

*Primary Examiner* — Huy Vu
*Assistant Examiner* — Zewdu A Beyen
(74) *Attorney, Agent, or Firm* — Brake Hughes Bellermann LLP

(57) ABSTRACT

A method of sending data through a network from a first computing device to a second computing device is described, where the computing devices adhere to a packet-based network protocol. A connection between the first computing device and the second computing device is established for a session according to the network protocol. A packet header template is defined having a plurality of static fields filled with static values valid for all packets sent during the session and variable fields that can acquire packet-dependent values for different packets sent during a session. A packet header is created based on the header template by defining, in a central processing unit, at least one value of a variable field and by reusing the static values for the static fields. The packet header is pre-pended to payload data to form a packet, and the packet is sent to the second computing device.

20 Claims, 4 Drawing Sheets

U.S. PATENT DOCUMENTS

2008/0313687 A1    12/2008    Rajakarunanayake

OTHER PUBLICATIONS

U.S. Appl. No. 11/717,326, Notice of Allowance mailed Apr. 7, 2010, 17 pages.

U.S. Appl. No. 11/820,102, Final Office Action mailed May 26, 2010, 22 pages.

U.S. Appl. No. 11/820,102 Notice of Allowance mailed Dec. 27, 2010, 14 Pgs.

Response to Non-Final Office Action for U.S. Appl. No. 11/171,326, mailed on Jan. 4, 2010, 10 pages.

Non-Final office Action for U.S. Appl. No. 11/820,102, mailed on Oct. 13, 2009, 17 pages.

Response to Non-Final Office Action filed for U.S. Appl. No. 11/820,102, filed Feb. 24, 2010, 14 pages.

Response to Final Office Action and Request for Continued Examination filed for U.S. Appl. No. 11/820,102, filed Aug. 25, 2010, 12 pages.

* cited by examiner

SYSTEM AND METHOD FOR A SOFTWARE-BASED TCP/IP OFFLOAD ENGINE FOR IMPLEMENTING EFFICIENT DIGITAL MEDIA STREAMING OVER INTERNET PROTOCOL NETWORKS

This description relates to streaming of digital media and, in particular, to a system and method for a software-based TCP/IP offload engine for implementing efficient digital media streaming over Internet protocol networks.

BACKGROUND

As Internet based broadband systems have become widely deployed, the display of high-quality streaming media (e.g., television signals) delivered through Internet protocol ("IP") based networks has been contemplated. Many vendors seek both to display media as well as to stream digital media in various customer premises, including digitally connected homes. However, because of the high bandwidth and processing power required to deliver and display digital video, it is quite a challenge to provide high quality IP-based television ("IPTV") functionality using traditional settop box ("STB") capabilities.

Use of the Transmission Control Protocol/Internet Protocol ("TCP/IP") as a protocol for network digital media transmission and reception has been proposed and adopted for its strength in error-free reliable data delivery in digital streaming media applications. The ubiquity of TCP/IP, the ease of creating applications on top of TCP/IP, and the error-free nature of the TCP/IP communications are some of its advantages. However, disadvantages of using TCP/IP as a transfer protocol for digital media applications include the fact that the central processing unit ("CPU") load when using TCP/IP is quite high and often limits the application performance on low end IPTV settop boxes used for digital media streaming and rendering.

TCP/IP it is a heavyweight protocol in terms of its resource use and generally does not scale well for high bandwidth applications on low powered STBs. Normally, when TCP/IP is used to receive an audio-visual ("AV") data stream from a server through a network for playback on a client, a network interface on the client receives packetized data into kernel space buffers, the packets flow up to the TCP/IP layer, and then the packets are copied to application buffers. In addition, the TCP/IP stack creates acknowledgement packets and sends the acknowledgement packets out through the network interface to the server. When the successful transmission of a packet is acknowledged, the received payload data stored in the application buffers gets copied back to playback decoders, from which the payload data is consumed by the video- and audio-rendering hardware, and displayed on an output device.

The processing steps required to move TCP/IP data input through the network interface to the output device using a standard TCP/IP stack are expensive in terms of CPU processing. For example, within the IP layer, IP packet headers are validated, and header checksum analysis is performed in software. Within the TCP layer, received packets are acknowledged back to the server, packets are copied from the network interface to user space application buffers via sockets, a checksum is performed at the TCP layer, and flow control is maintained through various algorithms based on slow-start methods, congestion avoidance, and requests for retransmissions.

At various protocol layer transitions (e.g., Ethernet to IP or IP to TCP) the CPU must compute information for use in packet headers. Often data is moved from one memory location to another for access by hardware. If cached memory access is used to speed up computations, the data caches must be written back to main memory because the CPU will make the cached data lines dirty, which degrades the CPU's performance. In addition, modern protocol stacks process packets with socket buffers, which provide a flexible implementation and general purpose data structure for passing data around internally in operating system kernels. However, the socket buffer allocation, tracking, and freeing (when transmissions are completed) can consume significant CPU resources as well.

Thus, the TCP/IP protocol stack generally uses significant CPU and memory resources, and low end STBs are usually unable to sustain high bandwidth reception (e.g., 20-50 Mbits/sec) without a TCP offload facility ("TOE"). While hardware acceleration of TCP has been applied in high performance servers, it adds an additional cost for STBs, and such a cost can be prohibitive.

SUMMARY

In a first general aspect, a method of sending data through a network from a first computing device to a second computing device is described, where the computing devices adhere to a packet-based network protocol. A connection between the first computing device and the second computing device is established for a session according to the network protocol. A packet header template is defined having a plurality of static fields filled with static values valid for all packets sent during the session and variable fields that can acquire packet-dependent values for different packets sent during a session. A packet header is created based on the header template by defining, in a central processing unit, at least one value of a variable field and by reusing the static values for the static fields. The packet header is pre-pended to payload data to form a packet, and the packet is sent to the second computing device.

Implementations can include one or more of the following features. For example, the network can include a wireless network. The protocol can be TCP/IP and a variable field of the header can includes a value of a sequence number identifying the packet within a sequence of a plurality of packets sent during the session. The protocol can be TCP/IP and a variable field of the header can include a value of an acknowledgement number for the packet, the acknowledgement number corresponding to a value of a sequence number of an acknowledgement packet that the first computing device expects to receive from the second computing device in response to the sending of the packet to the second computing device. The protocol can be TCP/IP, and the static fields can include a source field, a destination field, a window size field, and the variable fields can include a checksum field, and the method further include performing a checksum analysis on the packet and adding the result of the checksum analysis to the checksum field.

In another general aspect, a method is disclosed for sending a plurality of data packets through a network from a first computing device to a second computing device, where the computing devices adhere to a TCP/IP protocol. A connection between the first computing device and the second computing device is established for a session according to the network protocol. A packet header template is defined having static fields filled with static values valid for all packets sent during the session and variable fields that can acquire packet-dependent values for different packets of the plurality of data packets sent during a session, where the variable fields include a sequence number field and an acknowledgement number. Sequence number values are assigned to the sequence number fields of the header template for each of the plurality of packets. Acknowledgement number values are assigned to the acknowledgement number fields of the header template for each of the plurality of packets. The packet header template is appended to payload data to form the plurality of packets, and the data packets are sent to the second computing device.

Implementations can include one or more of the following features. For example, the network can include a wireless network. The method can include storing at least some data packets in a buffer, receiving acknowledgement packets from the second computing device, and determining whether a received acknowledgement packet includes an acknowledgement number that precedes the sequence number of the most recently sent packet, and if it does, resending at least one previously-sent data packet. After appending the header template to the data payload and before sending the packets, the packets can be copied directly to from an application space buffer to a network interface device. The first computing device can be a settop gateway and the second computing device can be a settop client, and both computing devices can be located within the same building. The static fields can include a source field, a destination field, and a window size field, and the variable fields can include a checksum field, and the method can further include performing a checksum analysis on packets of the plurality of packets and adding the result of the checksum analysis to the checksum field.

In another general aspect, a computing-device for sending a plurality of data packets through a network from a first computing device to a second computing device, where the computing devices adhere to a TCP/IP protocol, includes a processor, a network interface device, and a memory. The memory stores computer-executable instructions for causing the network interface device to establish a connection with the second computing device for a session according to the protocol, and for causing the processor to define a packet header template having static fields filled with static values valid for all packets sent during the session and variable fields that can acquire packet-dependent values for different packets of the plurality of data packets sent during a session, wherein the variable fields include a sequence number field and an acknowledgement number. The memory also stores computer-executable instructions for causing the processor to assign sequence number values to the sequence number fields of the header template for each of the plurality of packets, for causing the processor to assign acknowledgement number values to the acknowledgement number fields of the header template for each of the plurality of packets, for causing the processor to assign to append the packet header template to payload data to form the plurality of packets, and for causing the network interface device to send data packets to the second computing device.

Implementations can include one or more of the following features. For example, the memory can further include computer-executable instructions for causing the processor to store at least some data packets in a buffer, for causing the network interface device to process the reception of acknowledgement packets from the second computing device, for causing the processor to determine whether a received acknowledgement packet includes an acknowledgement number that precedes the sequence number of the most recently sent packet, and if it does, to resend at least one previously-sent data packet. The network can be a wireless network. The processor, the memory, and the network interface device can be located within a system on a chip. The memory can further include computer-executable instructions for causing the processor to, after appending the header template to the data payload and before sending the packet, copy the packet directly to from an application space buffer to the network interface device. The computing device can be a settop gateway and the second computing device can be a settop client, and both computing devices can be located within the same building. The static fields can include a source field, a destination field, a window size field, and the variable fields can include a checksum field, and the memory can further include computer-executable instructions for causing the processor to perform a checksum analysis on packets of the plurality of packets and to add the result of the checksum analysis to the checksum field.

The details of one or more implementations are set forth in the accompanying drawings and the description below. Other features will be apparent from the description and drawings, and from the claims.

DETAILED DESCRIPTION

Figure 1:
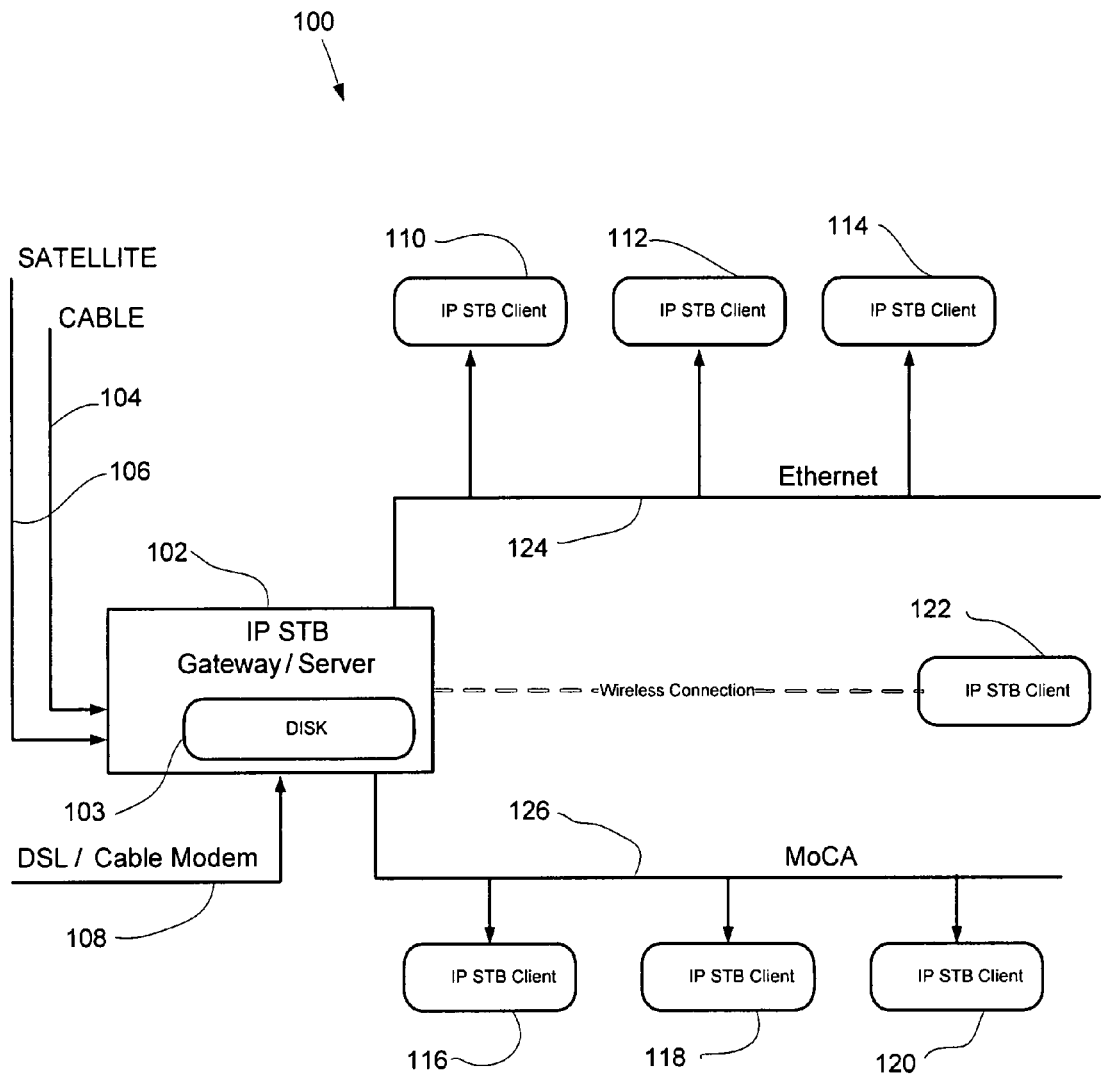
FIG. 1 is a block diagram of a client-server system for streaming digital media data from a server to a client.

As described herein, a server-side Software-based TCP/IP Offload Engine ("sSTOE") can be used to provide a reliable stream of error-free video/audio data to a client device with very low CPU utilization within the server. FIG. 1 is a schematic diagram of a system in which media data (e.g., audio data, video data, audio-visual data, such as, television) is received from a network (e.g., a local area network ("LAN") or a wide area network ("WAN"), such as, for example, the Internet) by an IP settop box server/gateway 102. The network can be a wired or a wireless network, such as, for example, a digital cable network 104, a satellite network 106, and/or a DSL network 108. The received data can be in other transport forms such as MPEG transport streams etc., and may be provided using a variety of protocols, such as, for example, UDP, RTP, or TCP/IP. After reception of the data, the data can be stored on one or more memory devices 103 within the settop box server 102 for later distribution to client devices for playback. The memory device 103 can be, for example, a disk, RAM or flash memory. After being received by the server/gateway 102 the media data can then be routed to one or more STB clients 110, 112, 114, 116, 118, 120, and 122 though a LAN that can be either a wired or a wireless network. Thus, redistribution of digital media can occur from one STB (i.e., Gateway 102) to another STB (i.e., IPSTB clients 110-120) in a digitally-connected location. One or several storage media (e.g., disks) 128 may be resident in gateway/server 102, and the disks can act as repositories for further streaming. The TCP/IP based digital media distribution architecture can be used to make any content available anywhere in the premises available to any rendering device.

Wired networks can be, for example, an Ethernet network 124 (e.g., 100BT full duplex Ethernet) or a Media over Cable Architecture (MoCA) network 126, which allows Ethernet-like packet transmission using in-home co-axial cable connections. The clients 110, 112, 114, 116, 118, 120, and 122 can include digital media renderers of various kinds, including digital settop boxes, which can output media data for rendering on a display device. The display device can be, for example, a television screen, a computer screen, a speaker, or any other audio or video display device.

Figure 2:
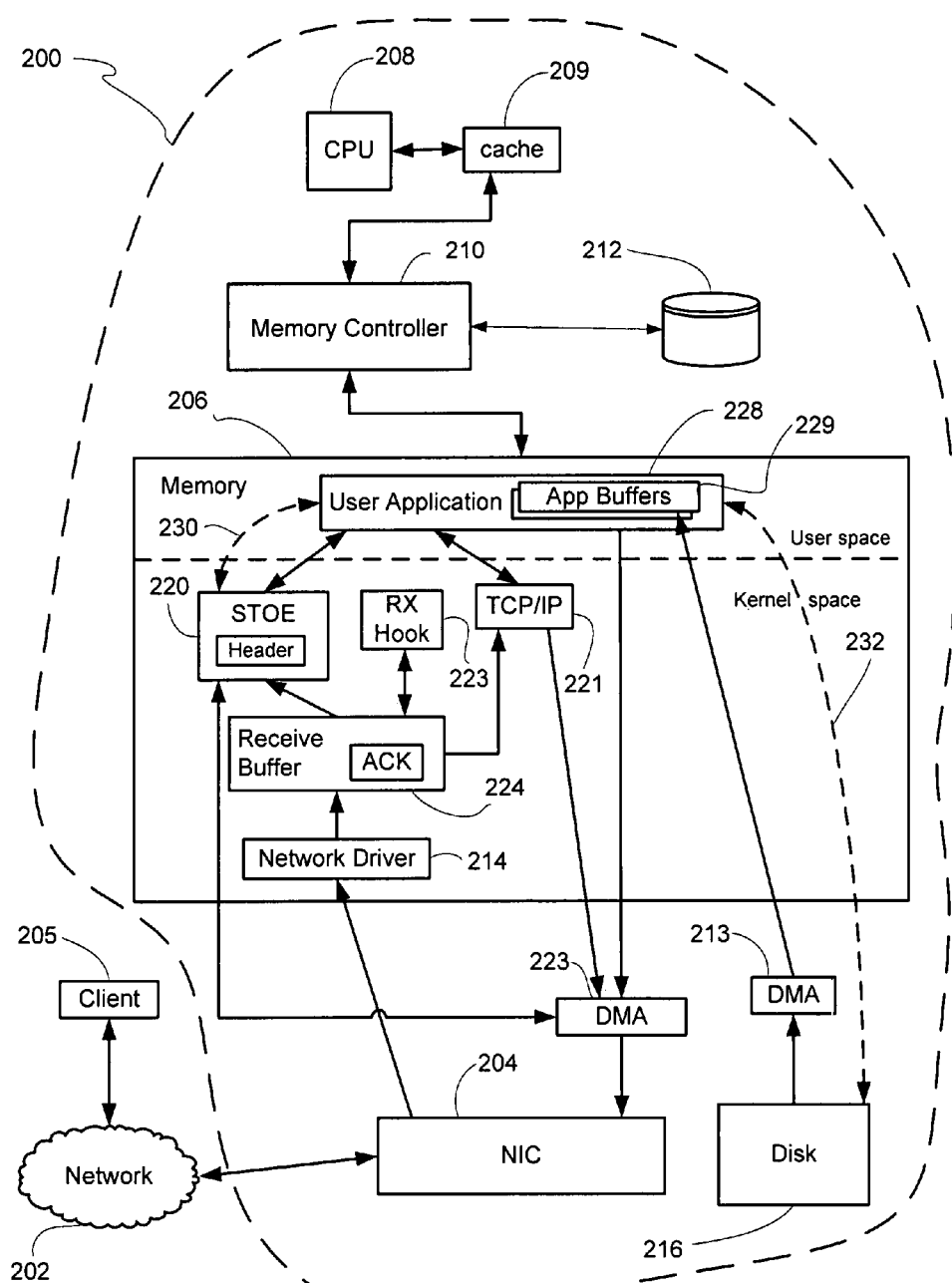
FIG. 2 is a block diagram of a system implementing a server-side software based TCP/IP offload engine.

FIG. 2 is a schematic diagram of a server 200 that can be used to efficiently stream digital media data to a client 205 for playback on a client device. TCP/IP packets of media data can be transmitted from a network interface 204 in the server 200 over a WAN or LAN network 202 to the client 205. The network interface 204 can be a network interface controller (NIC) through which media data passes en route to a memory device 206 of the system. The system 200 includes a central processing unit 208 that performs operations on data and that, in conjunction with a memory controller 210, can copy data to different locations in the memory 206.

As shown in FIG. 2, TCP/IP packets of media data can be stored on a storage medium (e.g., a disk) 216 and streamed from the sever 200 that includes a sSTOE 220 though a network 202 (e.g., a WAN or LAN) to a client 205 for playback. Alternatively, the media data need not be stored on a disk within the server 200, but may be transmitted from another system to the server 200 and stored briefly in volatile memory within the server 200 before being transmitted out through the network 202. The server 200 is connected to the network 202 through a network interface 204 (e.g., a network interface controller (NIC)). The server 200 includes a central processing unit ("CPU") 208 that performs operations on data and that, in conjunction with a memory controller 210, can copy data out of an into different locations in a main memory device 206 (e.g., random access memory ("RAM")). The CPU 208 is opertatively couple to a local cache 209 that is generally a smaller, faster memory device that the main memory 206 and that stores copies of the data fetched from the main memory 206. The CPU 208 can perform operation on the cached data and then, the operations have been performed, the data in the main memory 206 can be updated to be consistent with the new data in the cache 209. The server 200 also includes a non-volatile memory 212 suitable for embodying computer program instructions and data that are executed and/or processed by the processor 208. The memory 212 can be one or more of, for example, a semiconductor memory device, e.g., EPROM, EEPROM, and flash memory devices; magnetic disks, e.g., internal hard disks or removable disks; magneto-optical disks; and CD-ROM and DVD-ROM disks. Certain elements of the system shown in FIG. 2 can all be located on a single chip to form a system on a chip ("SOC"). For example, two or more of the CPU 208, cache 209, memory controller 210, memory 212, and memory 206 can be located on a SOC.

As shown in FIG. 2, TCP/IP data packets can be read from the disk 216 through a direct memory access ("DMA") engine 213 using a direct-IO method into user space buffers 229 within a user application 228. Without the sSTOE 220, using the normal TCP/IP stack 521, data packets would be received by an application 228 running on the server 200 and then copied in various stages from application layer buffers 229 to a socket layer and then to the TCP/IP stack 221 and all the way down to the NIC 204. The TCP/IP stack 221 also would receive an acknowledgement packet ("ACK") from the client 205 via the NIC 204 for every transmitted packet and would maintain the communications channel alive by handling requested retransmissions with the client. Within the IP layer, the IP packet headers of received packets must be validated, and checksums must be performed. Within the TCP layer, processing of packets includes copying the packets from user space to socket space, receiving ACK packets from the client and releasing data in buffers, creating TCP checksums and headers for the transmission of data packets to the client, sending payload data with the appropriate header, validating the checksum of received packets at the TCP layer, and managing state machines for retransmission of packets.

With the assistance of the sSTOE 220, as explained in more detail below, payload data for packets being streamed out from the server 200 to the client 205 can be received from the disk 216 and combined with appropriate pre-formatted headers generated by the sSTOE 220 and then transmitted over an Ethernet connection to the client 205 with minimal packet copying within the server 200. Using pre-formatted headers generated by the sSTOE 220 can significant reduce the processing and memory resources required from the server to stream data to client 205. With the pre-formatted headers supplied by the sSTOE, the packetized data can be routed directly from the application buffers 229 to NIC 204 for transmission to the client 205, without first being passed through the traditional TCP/IP stack 221. The sSTOE 220 also receives all ACK packets from the client 205 and performs the necessary computations to handle flow control and retransmissions of packets (when necessary). The sSTOE can also manage the TCP state machine, without needing a helper socket. Thus, the sSTOE 220 can conserve processing and memory resources with respect to using the standard TCP/IP stack 221 because packets do not need to be copied to several different memory addresses as they are moved from the application buffers 229 to the NIC 220.

To choose between using the sSTOE 220 and the normal TCP/IP stack 221, after a communications channel is established between the server 200 and the client 205 and an ACK packet is received by the server 200, a receive filter ("RX Hook") 223, which can be implemented in software, can be used to determine when to initiate the sSTOE 202 and forward packets to the sSTOE while bypassing the TCP/IP stack 221 and when to pass the packets to the TCP/IP stack 221. Similarly, a software-implemented transmit filter can be used to determined when to use the sSTOE 220 to process packets for sending from the server 200 to the client 205. These hooks provide inter operability with the standard protocol stack, while the sSTOE 220 operates.

As the control paths 230 and 232 show, the user application 228 intervenes only when setting up and tearing down the TCP/IP session with the client 205 and when setting up the sSTOE 220 to start/stop operation of the sSTOE. In this manner several processing steps that would otherwise consume CPU cycles in the data path are reduced. For example, and as described in more detail below, the acknowledgement of received packets back to the client 205 can be simplified by using pre-stored headers, such that less data needs to be processed when sending an ACK packet; copying TCP/IP packets to user space can be eliminated; and checksum validation of data can be completely eliminated in the TCP layer.

Figure 3:
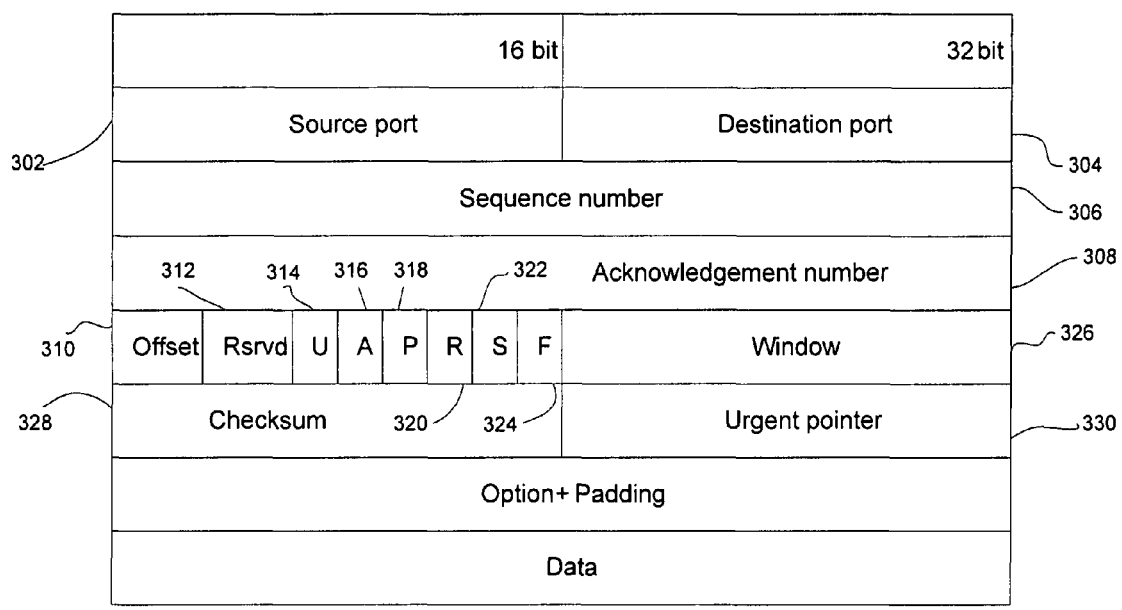
FIG. 3 is a block diagram of a TCP header template.

Several modifications to the traditional TCP/IP protocol can be made to provide a simple sSTOE that can efficiently process the data traffic that is streamed from the server 200 to the client 205. FIG. 3 shows the fields of a TCP packet 300, and the role of these fields in the sSTOE is described below. The source port field 302 indicates the address of the port from which the packet originated and can be used in the sSTOE 220 for packet filtering. The destination port field 304 indicates the destination port or MAC address to which the packet is transmitted and also can be used for packet filtering.

During normal operation after a TCP/IP session has been established between the client and the server, the sequence number ("SEQ") field 306 contains the sequence number of the first data octet in this segment. However, when a synchronize ("SYN") packet is present to initiate a new connection and synchronize the sequence numbers between the server 200 and the client 205, the sequence number field 306 contains the initial sequence number ("ISN"), which can be a randomly selected number. Then, the value of the first data octet is ISN+1. When the server operates when the sSTOE 220 to stream data from the server 200 to the client, the value of the sequence number field 306 is the byte offset in the stream plus the initial sequence number. Thus, the value of the sequence number field 306 identifies a packet, and if a client sends a message that it did not receive a particular packet and requests retransmission, then the packet can be retransmitted from the server based on the requested sequence number.

If the ACK control bit is set, the acknowledgement number field 308 contains the value of the next sequence number that the sender of the segment is expecting to receive. Once a connection is established, this value is always sent. In the sSTOE operation, for packets transmitted from the server 200 to the client 205 this number is constant. For packets received from the client, the value of the ACK number field provides information about which packet has been received by the client. The data offset field 310 contains the number of 32-bit words in the TCP header, which indicates where the data begins. The TCP header (even one that includes options) generally has a length that is an integral number of 32 bits. When using the sSTOE 220, the value of the offset field value can bet set to a constant value (e.g., 8, which gives a 32 byte TCP Header). The reserved field 312 is reserved for future use and is set to zero.

Various control bits can be set. For example, a valid urgent control bit 314 can indicate that an urgent pointer field is significant, but this bit is not used when operating the sSTOE 220. A valid acknowledgement control bit 316 indicates that an acknowledgement field is significant, and this field is always valid when operating the sSTOE 220. A valid push control bit 318 indicates that the session is operating in push mode, but this bit is not used when operating the sSTOE. A valid reset ("RST") control bit 320 indicates that the TCP/IP connection must be reset and is used by the sSTOE to terminate a session between the client and server. A valid synchronize ("SYN") bit 322 is used to indicate that sequence numbers of packets must be synchronized between the server and the client and is always set to be valid when operating the sSTOE 220. A valid finish ("FIN") control bit 324 indicates that no more data is to be sent from the sender. Thus, the sSTOE uses only the acknowledgement bit 316, the synchronize bit 322, the reset bit 320, and the finish bit 324, while other control bits of the TCP header are ignored.

When using the sSTOE 220, there is no need for sliding window adjustment, because data is consumed directly from the socket buffers by a playback engine on the client 205. The window can have a fixed size chosen to equal one maximum transmission unit ("MTU") (e.g., 1448 bytes) at the server 200. Therefore, value of the window field 326 can be set to this constant value.

The checksum field 328 is the 16 bit one's complement of the one's complement sum of all 16-bit words in the header and text of a packet. If a segment contains an odd number of header and text octets to be check-summed, the last octet is padded on the right with zeros to form a 16-bit word for checksum purposes. The pad is not transmitted as part of the segment. While computing the checksum, the checksum field itself is replaced with zeros. Packets received at the client 205 need not be check-summed because of the Ethernet cyclic redundancy check ("CRC") validity that is performed at the Ethernet datalink layer. However, in the server 200 packets must be check-summed. For TCP packets that are 4-byte aligned in memory, an efficient method of performing the checksum is to use an algorithm that computes 2-byte checksums in parallel with using 32-bit instructions.

The urgent pointer field 330 communicates the current value of the urgent pointer as a positive offset from the sequence number in this segment. The urgent pointer points to the sequence number of the octet following the urgent data. This field can only be interpreted in segments for which the urgent control bit 314 has been set, and therefore is unused in the sSTOE. The options field 332 may be transmitted at the end of the TCP header and always has a length that is a multiple of 8 bits. The sSTOE 220 does not support TCP options on the server side, and therefore this field is ignored by the sSTOE 220. The data field contains the digital media compressed payload that is to be fed playback engine on the client for rendering.

Initialization of the sSTOE and Connection Establishment

The sSTOE 220 only needs a simple hook 223 to filter packets arriving at a designated TCP port of the server 200. The hook creates a session between the server 200 and the client 205 based on the source IP address and the destination port pair of the incoming packets. There is no need for a helper socket on the server side because all the information needed to talk back to the client 200 can be deduced from the Ethernet and IP headers of the received ACK packet by swapping the sequence ("SEQ") number and ACK numbers.

The processing of a synchronization ("SYN") packet is used to handle connection establishment. The client 205 sends an initial SYN packet to the server 200, and the initial SYN packet needs to be acknowledged by adding +1 to the sequence number of the received packet. Thus, an ACK packet having an acknowledgement number equal to the sequence number of the received SYN packet+1 is created within the server 200 and sent back to the client 205 as the acknowledgement packet. In addition, the server 200 can pick a random 32-bit unsigned integer as its initial sequence number. This initial sequence number is used to make up the initial SYN-ACK packet. The SYN-ACK can be a 66 byte packet with only the header fields.

After receiving the server's SYN+ACK packet from the server, the client 205 sends an ACK packet again, which constitutes the three-way handshake to establish the connection, and the connected system call succeeds. Then, the server 200 is ready to send data to the client 205, and it also has pre-stored a transmission header template to use when communicating with the client.

Prestoring the Transmission Headers:

A packet received from the client 205 (e.g., a SYN packet) by the server 200 can be used to generate a template header for sending out packets from the server. The template header is based on the Ethernet, TCP, and IP headers of the received packet and information in these headers from the received packet can be largely reused when streaming data from the server to the client. If the connection state does not change, the server-side TCP header only needs to change the value of the sequence number field when a new SEQ packet is sent out or the server-side TCP header only needs to change the value of the acknowledgement number field when a new ACK packet is sent out. Therefore, a reusable header template containing static values used in the TCP/IP header that do no change during a session can be generated based on the initial SYN/SYN-ACK/ACK handshake that is used to establish the server-client connection, and this header template can be stored in memory 206 for later reuse when preparing packets for streaming from the server to the client. An assumption can be made that the window size is at least as large as 188×7 bytes, which is generally true, since the client is generally configured to receive a 1-MTU Ethernet frame. If this condition is not met, in addition to modifying the TCP header, the IP header also can be modified to send packets of a length smaller than 188×7.

Figure 4:
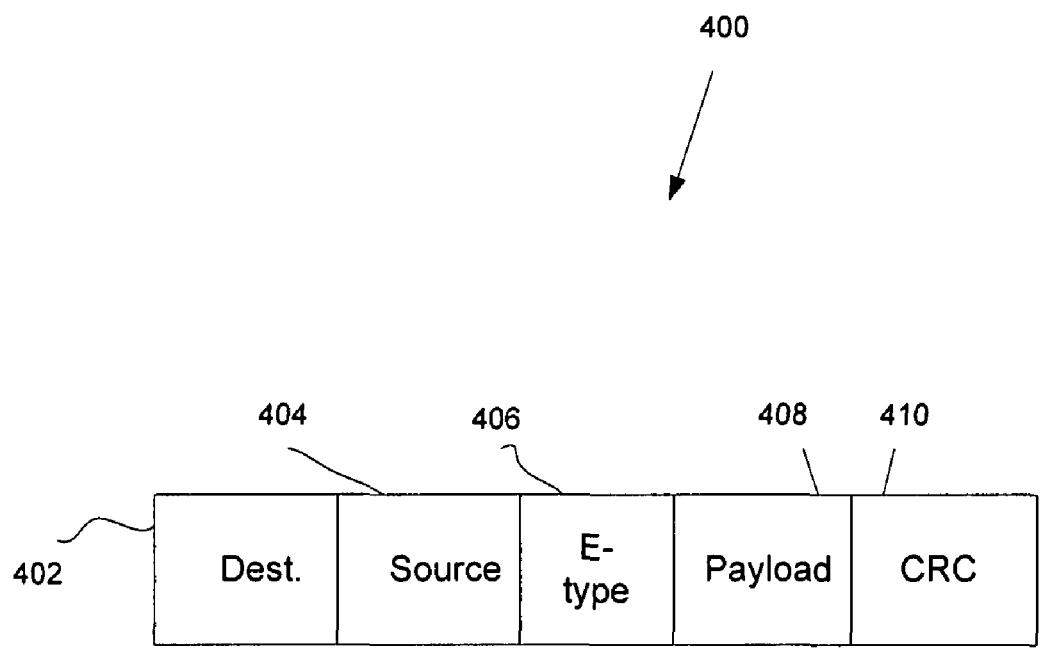
FIG. 4 is a block diagram of an Ethernet frame.

FIG. 4 is diagram of a possible Ethernet frame format 400 that includes an Ethernet destination address field 402, an Ethernet source address 404, an Ether TYPE field 406, payload data 408, and a CRC field 410. Therefore, in the header template the Ethernet destination address field can be filled in based on information in the source field 404 of a frame received from the client 205 and an Ethernet source address field that is filled in based on information in the destination field 402 of a frame received from the client. The Ethernet header also includes an Ether TYPE field that is filed in based on information in the Ether TYPE field 406 of a received packet and usually the value corresponds to IP over Ethernet.

The IP Header of the header template can include the following fields:
- IP TOS, which indicates a type of service that can be selected to give network priority. Usually IP TOS=0 will suffice for this field.
- IP ID=0, which can be ignored usually when packets are not fragmented.
- IP Frag_Offset=0, which indicates that packets should not be fragmented.
- IP TTL, which indicates the value of a time to live ("TTL") counter that is decremented every time a router handles the packet. If the value of the TTL field reaches zero, the packet is discarded, preventing packets from running in circles forever and flooding a network. The initial IP TTL value can be set equal to a relatively small number, e.g., 32.
- IP Ver, which indicates the IP version and can be set equal to 4.
- IP HeaderLen, which indicates the number of 32-bit words forming the header and can be set to 5.
- IP TotalLen, which is the total length of the header and can be set to 52, which is the sum of the IP header length (20 bytes) and the TCP header length (32 bytes).
- IP Protocol, which indicates the value of the IP protocol and can be set equal to 6 to indicated TCP protocol.
- IP Src address, which is the IP Source address value that is filled in from the destination address of the received packet,
- IP Dest address, which is the IP Destination Address that is filled in from the source of the received packet.

Based on the information in this IP header template, an IP header checksum calculation can be performed, using a well-known algorithm. In one implementation, the IP header is 4-byte aligned, and the algorithm simplifies to a simple function, ip_fast_csum (fast checksum function). Once the checksum is calculated, it is populated in the IP CHECKSUM field in the IP header.

The TCP header of the header template can include the following fields:
- TCP SOURCE PORT, which has a value that is filled in based on the destination port value from the received packet, as described above.
- TCP DEST PORT, which has a value that is filled in based on the source port value of the received packet, as described above.
- ACK, which is set to 1.
- FIN, which is set to zero during streaming of data while the session is connected.
- SYN, which is set to zero while the session is connected.
- RST, which is set to zero while the session is connected.
- ACK, which has a value of the sequence number of the packet that is expected next from the client.
- SEQ provides an index number of the transmitted packet.
- TCP Window is size set to 1448 (i.e., single maximum transfer unit ("MTU") size). The assumption is that the window is at least as big as one 188×7 byte window. This is usually true, as the receiver size always can accept at least 1-Ethernet MTU. If this condition is not met, the IP header as well as TCP header can be recomputed to send packets of different length smaller than 188×7. This would be a rare occurrence as well, and does not happen frequently with modern protocol stacks.
- doff=data offset=8 (specifies TCP header size as 32 bytes) is the data offset value that is set to 8, which specifies the header size as 32 bytes, with the values of all other fields being set to zero.

Fields of the TCP header that change during data transmission include a checksum field and a sequence number ("SEQ") field. The value of the SEQ field is incremented for successive packets, and an initial checksum value can be calculated based on the values of fields in the TCP header that do not change. The checksum calculation also must be re-computed each time a new packet is received.

Steady State sSTOE TCP/IP Operation at Server

Once the connection between the server 200 and the client 205 is established, the sSTOE 220 automatically takes over the communications with the client and transmits the streaming data directly to NIC 204 to send out over the network 202 to the client. The client 205 of the sSTOE 220 is assumed to be a standard TCP/IP client that need not receive any indication that it is communicating with the sSTOE 220. Therefore, the sSTOE is completely inter-operable with any type of TCP/IP capable client device that accepts streaming data over TCP/IP.

After the server-client connection is established and the server 220 begins sending out data packets to the client, the static value in the Ethernet, IP, and TCP template headers can be used as the headers of the packets that are sent out from the server to the client. Only the values of the TCP header's SEQ field and the value of the checksum field need to be updated and inserted into the variable fields of the template header used for outbound packets. Thus, a packet header template containing the static values of the header can be stored in the memory 206, and the CPU 206 only needs update the variable values of the header template (e.g., the value of the acknowledgement number field and/or the sequence number field) before pre-pending the header template to a payload data to form a packet and then sending out the packet. Therefore, the CPU 208 only needs to writeback (or export) data that pertains to the variable values in the header template from its cache 209 to the header template in main memory 206. Because the relatively little data needs to be written back from the cache to the main memory CPU and memory resources are conserved and the sSTOE can operate quite efficiently.

After a packet has been prepared with the appropriate header (i.e., containing the static fields and the variable fields, as defined by the CPU 208), the sSTOE 220 can instruct the Ethernet DMA 223 to grab the packet from the application buffer 229 and send the packet to the client 205. Then the information pertaining to variable portions of the header is flushed from a CPU-cache, and the packet is sent out via the transmit hardware. Finally, the packet is sent out over the Ethernet hardware.

After the server-client connection is established, the server 200 sends data to the client 205. Within the server 200, the number of the packet that has last been acknowledged by the client is compared with the sequence number of the packet that is ready to be sent out from the server 200. If the client's acknowledgement is not for the current packet, then the server must retransmit a packet that it previously attempted to send. For example, if the ACK packet from the client is not received for one receiver window length before the current sequence number, the transmission can be stalled for a certain time period (e.g., 20-40 ms), and then retransmission can occur from the point of the missing packet. Alternatively, the server can wait to receive three duplicate ACK packets from the client, and then begin retransmitting from the missing point, whichever occurs first.

Reception of packets at the client 205 can be handled in the standard manner by the client TCP/IP stack, and the client 205 need not be aware that it is in communication with the sSTOE 220.

The sSTOE 220 keeps track of the next sequence to transmit. If the acknowledgement for a packet that is sent out is not received within one window size from the current sequence number, the packet for which the sequence number is missing can be retransmitted, after a timeout period. The length of the timeout period can be adjusted depending on the bandwidth requirement of the media file being transmitted. Usually a 20 ms timeout period is sufficient and not too aggressive and has the effect of providing an extremely fast, proactive server-side retransmission of missing packets. Thus, the sSTOE 220 can transmit one packet every 1 ms until acknowledgements are received and the client has caught up. The client 205 may also request fast retransmission by sending three duplicate ACK packets for the previous packet to indicate that the server 200 should back up to the missing data packet and start retransmitting from the missing packet.

Data can be fed from the user application 228 to the sSTOE 220 from a ring buffer, such that it is possible to search back to packets from the past 1-million bytes or so in the past, in sequence number. This means that it is possible to locate and send back the packets that exist in the ring buffer, if a retransmission is requested. In the case of live streaming, an algorithm can be used for streaming from the hardware record buffers, which are large enough to allow searching back to previous sequence numbers. In normal operation, it is generally not necessary to search behind more than 64K or so of data, because the maximum window size is usually 64K. Therefore, it is quite reasonable to assume that a missed packet could be found in an application buffer 229.

In one implementation of the sSTOE 220, after a retransmission is requested, the sSTOE can retransmit all the packets that have been transmitted since the last successful transmission of a packet was acknowledged. This methodology works with latencies acceptable in the video buffer model. This jitter when using the sSTOE 220 is very low (e.g., under 50-100 ms), which is a big improvement over the standard TCP/IP algorithm with slow-start mechanism which can introduce jitter on the order of 200-300 ms.

Transmission of packets from the server 200 tends to speed up after retransmission, if the server is pacing to a PCR, and will send data faster than normal to catch up the clock tick, which can beset to a predetermined frequency (e.g., 27 MHz). This has the automatic effect of reducing the jitter observed at the video decoder, because after every dropped packet, the server automatically speeds up to compensate for the delayed time lag.

Session Teardown—Server Side

To initiate session teardown, a TCP packet with the RST (Reset) field set or FIN bit set can be sent from the client 205 to the server 200, which usually breaks the connection to the server and causes the server to hang up. The sSTOE 220 will go back to a closed state and notify any application hooks waiting for the session close signal. If a FIN packet is transmitted from the client, a final FIN-ACK is transmitted from the server to the client. After the sSTOE 520 goes into a closed state, any remaining slow handshakes for Finish (e.g., the TCP four-way handshake) will be automatically responded to by the normal TCP/IP stack, when the sSTOE is deactivated.

Although the focus of the current invention is on the Digital Video Settop, minor variations of the system and method can be used for A/V recording devices such as Network attached storage devices, PCs, DVD recorders, and other streaming media renderers.

An advantage of the sSTOE described here is high performance, very low CPU usage for TCP/IP protocol implementation sufficient to handle high bandwidth video transmission. It is also low cost (i.e., there is no need for additional hardware assist, requiring additional silicon). The sSTOE allows a 300 MHz class Mips processor (costing about $10-$20) to compete effectively with 2.5+GHz class CPUs (costing over $100-$200) in the streaming of multiple, high bandwidth HDTV streams simultaneously. The sSTOE is capable of operating over any NIC, including wired Ethernet, wireless, and emerging new standard Ethernet over cable (MoCA). The sSTOE works side by side with the standard TCP/IP protocol stack, and allows the standard protocol stack to process non-video/audio data seamlessly. Therefore, all applications that were designed to run over IP, UDP or TCP type network protocols work seamlessly with sSTOE. The fact that CPU power required to serve error free content delivered via TCP/IP is less than 5% of the available bandwidth means lower cost chips can be targeted to the IPTV platform, with the help of the sSTOE.

The sSTOE is a critical enabler for wireless. In wireless networks packet loss is higher, and error recovery is a must. The TCP/IP based protocols are ideal for the wireless medium. The TCP/IP is an end-to-end protocol, and protects against packet loss in any segment; especially if one of the segments is wireless.

The variations of the sSTOE method can be used for any type of connection oriented delivery of any type of data over a network medium, e.g. speeding up of downloads; accessing file server or web-servers etc. The requirement that must be met is that packet, or certain headers should be pre-computable for the lifetime of the session. Additionally, if must be possible to stream out directly from application buffers, without copying data to NIC buffers or kernel space buffers.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, modifications, substitutions, and changes can be made.

What is claimed is:

1. A method of sending media data through a network from a first computing device to a second computing device, the computing devices adhering to a packet-based network protocol, the method comprising:
    establishing a connection between the first computing device and the second computing device for a session according to the network protocol;
    receiving an acknowledgement packet from the second computing device;
    passing the received acknowledgement packet to a receive hook;
    defining, via a central processing unit of the first computing device, based on the received acknowledgement packet, a packet header template for packets sent during the session, the template having a plurality of static fields filled with static values valid for packets sent during the session and variable fields that can acquire packet-dependent values for different packets sent during a session;
    storing the packet header template in a memory location of a memory device of the first computing device;
    creating, in a kernel space of the first computing device, based on a signal from the receive hook, a packet header based on the stored header template by updating, via the central processing unit of the first computing device, at least one packet-dependent value of a variable field of the template and combining the variable field values with the static values for the static fields from the stored header template;
    receiving payload data in a user space buffer of the first computing device via a direct memory access (DMA) engine;
    pre-pending the packet header to payload data to form a packet;
    transmitting, via an Ethernet DMA without passing through a network protocol stack, the packet that includes the packet header and the payload from the user space buffer of the first computing device to a network interface of the first computing device; and
    sending the packet that includes a copy of the updated packet header from the network interface to the second computing device.

2. The method of claim 1, wherein the network comprises a wireless network.

3. The method of claim 1, wherein the protocol comprises TCP/IP and wherein a variable field of the header includes a value of a sequence number identifying the packet within a sequence of a plurality of packets sent during the session.

4. The method of claim 1, wherein the protocol comprises TCP/IP and wherein a variable field of the header includes a value of an acknowledgement number for the packet, the acknowledgement number corresponding to a value of a sequence number of an acknowledgement packet that the first computing device expects to receive from the second computing device in response to the sending of the packet to the second computing device.

5. The method of claim 1, wherein the protocol comprises TCP/IP and wherein the static fields include a source field, a destination field, and a window size field, wherein the variable fields include a checksum field, and the method further comprising performing a checksum analysis on the packet and adding the result of the checksum analysis to the checksum field.

6. The method of claim 1, wherein the protocol comprises TCP/IP and further comprising exporting from a cache the at least one value of a variable field defined by the central processing unit to a memory to associate the at least one value with the static values for the packet header.

7. A method of sending a plurality of data packets through a network from a first computing device to a second computing device, the computing devices adhering to a TCP/IP protocol, the method comprising:
    establishing a connection with the second computing device for a session according to the network protocol;
    receiving an acknowledgement packet from the second computing device;
    passing the received acknowledgement packet to a receive hook;
    defining, via a central processing unit of the first computing device, based on the received acknowledgement packet, a packet header template for packets sent during the session, the template having static fields filled with static values valid for packets sent during the session and variable fields that can acquire packet-dependent values for different packets of the plurality of data packets sent during a session, wherein the variable fields include a sequence number field and an acknowledgement number field;
    storing the packet header template in a memory location of a memory device of the first computing device;
    assigning sequence number values with the central processing unit to the sequence number fields of the header template for each of the plurality of packets;
    assigning acknowledgement number values with the central processing unit to the acknowledgement number fields of the header template for each of the plurality of packets;
    creating, in a kernel space of the first computing device, based on a signal from the receive hook, updated packet header templates based on the stored header template by updating the sequence number values and the acknowledgement number values of the stored packet header template;

receiving payload data in a user space buffer of the first computing device via a direct memory access (DMA) engine;

pre-pending updated packet header templates to payload data to form the plurality of packets;

transmitting, via an Ethernet DMA without passing through a network protocol stack, packets that include the packet header templates and the payload data from the user space buffer of the first computing device to a network interface of the first computing device; and sending the data packets that include a copy of a pre-pended packet header from the network interface to the second computing device.

8. The method of claim 7, further comprising:
storing at least some data packets in a buffer;
receiving acknowledgement packets from the second computing device;
determining whether a received acknowledgement packet includes an acknowledgement number that precedes the sequence number of the most recently sent packet, and if it does, resending at least one previously-sent data packet.

9. The method of claim 7, wherein the network is a wireless network.

10. The method of claim 7, further comprising, after appending the header template to the data payload and before sending the packet, copying the packet directly to from an application space buffer to a network interface device.

11. The method of claim 7, wherein the first computing device is a settop gateway and the second computing device is a settop client, and wherein both computing devices are located within the same building.

12. The method of claim 7, wherein the static fields comprise a source field, a destination field, a window size field, wherein the variable fields include a checksum field, and the method further comprising:
performing a checksum analysis on packets of the plurality of packets; and
adding the result of the checksum analysis to the checksum field.

13. The method of claim 7, wherein the protocol comprises TCP/IP and further comprising exporting from a cache the at least one value of a variable field defined by the central processing unit to a memory to associate the at least one value with the static values for the packet header.

14. A computing-device for sending a plurality of media data packets through a network from a settop box gateway server to a settop box client located within the same building as the settop box gateway, the settop box gateway server and the settop box client adhering to a TCP/IP protocol,
wherein the computing-device comprises:
a central processing unit;
a network interface device; and
a memory for storing computer-executable instructions for:
causing the network interface device to establish a connection with the settop box client for a session according to the protocol and to receive an acknowledgement packet from the second computing device;
causing the central processing unit to pass the received acknowledgement packet to a receive hook and to define, based on the received acknowledgement packet, a packet header template for packets sent from the gateway server to the client during the session, and store the header template in memory location of a memory device of the computing-device, the packet header template having static fields filled with static values valid for packets sent during the session and variable fields that can acquire packet-dependent values for different packets of the plurality of data packets sent during the session, wherein the variable fields include a sequence number field and an acknowledgement number;
causing the central processing unit to assign sequence number values to the sequence number fields of the header template for each of the plurality of packets;
causing the central processing unit to assign acknowledgement number values to the acknowledgement number fields of the header template for each of the plurality of packets;
causing the central processing unit to create, in a kernel space of the first computing device, based on a signal from the receive hook, updated packet header templates based on the stored header template by updating the sequence number values and the acknowledgement number values of the stored packet header template;
causing the central processing unit to receive payload data in a user space buffer of the first computing device via a direct memory access (DMA) engine;
causing the central processing unit to pre-pend packet updated header templates to payload data to form the plurality of packets;
causing the central processing unit to transmit, via an Ethernet DMA without passing through a network protocol stack, packets that include the packet header templates and the payload data from the user space buffer of the first computing device to a network interface of the first computing device; and
causing the network interface device to send data packets that include a copy of a pre-pended packet header to the second computing device.

15. The computing-device of claim 14, wherein the memory further comprises computer-executable instructions for:
causing the central processing unit to store at least some data packets in a buffer;
causing the network interface device to process the reception of acknowledgement packets from the second computing device; and
causing the central processing unit to determine whether a received acknowledgement packet includes an acknowledgement number that precedes the sequence number of the most recently sent packet, and if it does, to resend at least one previously-sent data packet.

16. The computing-device of claim 14, wherein the network is a wireless network.

17. The computing-device of claim 12, wherein the central processing unit, the memory, and the network interface device are located within a system on a chip.

18. The computing-device of claim 14, wherein the memory further comprises computer-executable instructions for causing the central processing unit to, after appending the header template to the data payload and before sending the packet, copy the packet directly to from an application space buffer to the network interface device.

19. The computing-device of claim 14, wherein the computing device is a settop gateway and the second computing device is a settop client, and wherein both computing devices are located within the same building.

20. The computing-device of claim 14, wherein the static fields comprise a source field, a destination field, a window size field, wherein the variable fields include a checksum field, and wherein the memory further comprises computer-executable instructions for causing the central processing unit to:

perform a checksum analysis on packets of the plurality of packets; and add the result of the checksum analysis to the checksum field.

* * * * *

UNITED STATES PATENT AND TRADEMARK OFFICE
CERTIFICATE OF CORRECTION

| | | |
|---|---|---|
| PATENT NO. | : 8,170,023 B2 | Page 1 of 1 |
| APPLICATION NO. | : 11/708439 | |
| DATED | : May 1, 2012 | |
| INVENTOR(S) | : Yasantha Rajakarunanayake et al. | |

It is certified that error appears in the above-identified patent and that said Letters Patent is hereby corrected as shown below:

In column 16, line 55, in claim 17, delete "claim 12," and insert -- claim 14, --, therefor.

Signed and Sealed this
Sixteenth Day of October, 2012

David J. Kappos
*Director of the United States Patent and Trademark Office*